(12) United States Patent  
Sonnendorfer et al.

(10) Patent No.: US 9,174,660 B2
(45) Date of Patent: Nov. 3, 2015

(54) SHOPPING TROLLEY WITH DISPLAY OR ADVERTISING SURFACE

(76) Inventors: Horst Sonnendorfer, Puchheim (DE); Franz Wieth, Puchheim (DE)

( * ) Notice: Subject to any disclaimer, the term of this patent is extended or adjusted under 35 U.S.C. 154(b) by 1956 days.

(21) Appl. No.: 12/096,708

(22) PCT Filed: Dec. 5, 2006

(86) PCT No.: PCT/DE2006/002157
§ 371 (c)(1),
(2), (4) Date: Sep. 4, 2008

(87) PCT Pub. No.: WO2007/065416
PCT Pub. Date: Jun. 14, 2007

(65) Prior Publication Data
US 2008/0313938 A1    Dec. 25, 2008

(30) Foreign Application Priority Data

Dec. 8, 2005 (DE) ............... 20 2005 019 315 U

(51) Int. Cl.
*G06Q 30/00* (2012.01)
*B62B 3/14* (2006.01)
*G06Q 30/02* (2012.01)

(52) U.S. Cl.
CPC ........ *B62B 3/1408* (2013.01); *B62B 3/1416* (2013.01); *B62B 3/1424* (2013.01); *B62B 3/1428* (2013.01); *G06Q 30/0253* (2013.01)

(58) Field of Classification Search
USPC ............................. 705/14.64, 14.4
See application file for complete search history.

(56) References Cited

U.S. PATENT DOCUMENTS

| | | | | |
|---|---|---|---|---|
| 4,071,740 A * | 1/1978 | Gogulski | ............. | 235/431 |
| 5,250,789 A * | 10/1993 | Johnsen | ............. | 705/14.4 |
| 5,773,954 A | 6/1998 | VanHorn | | |
| 6,119,935 A * | 9/2000 | Jelen et al. | ............. | 235/383 |
| 6,177,880 B1 * | 1/2001 | Begum | ............. | 340/5.9 |
| 6,484,939 B1 * | 11/2002 | Blaeuer | ............. | 235/383 |
| 8,152,062 B2 * | 4/2012 | Perrier et al. | ............. | 235/383 |
| 2004/0111320 A1 * | 6/2004 | Schlieffers et al. | ............. | 705/16 |
| 2006/0293968 A1 * | 12/2006 | Brice et al. | ............. | 705/26 |

FOREIGN PATENT DOCUMENTS

| | | |
|---|---|---|
| DE | 3611624 A1 | 1/1987 |
| EP | 1573467 A2 | 9/2005 |
| WO | 2004053632 A2 | 6/2004 |

* cited by examiner

*Primary Examiner* — Michael Bekerman
(74) *Attorney, Agent, or Firm* — Laurence A. Greenberg; Werner H. Sterner; Ralph E. Locher

(57) ABSTRACT

The purchasing aid is temporarily connected to a housing for the advertising surface which is permanently present, said housing being arranged fixedly on the shopping trolley, wherein the fastening for the purchasing aid is arranged outside the advertising surface, and the advertising surface which is permanently present can optionally also be used as a display for the purchasing aid.

10 Claims, 1 Drawing Sheet

SHOPPING TROLLEY WITH DISPLAY OR ADVERTISING SURFACE

BACKGROUND OF THE INVENTION

1. Field of the Invention

The invention relates to the field of advertising displays on a shopping cart.

2. Prior Art

The product description "Portable Store Assistant" from the Wincor Nixdorf company, printed in October 2004, discloses a shopping assistant.

The shopping assistant is a standalone PC which is operated under the Windows CE operating system and represents a not inconsiderable value.

This shopping assistant can be fitted on the push handle of a shopping cart and displays various information to the customer on its display.

The shopping assistant also comprises a bar code reader. As soon as a bar code on a product is brought close to the scanner, the shopping assistant's display displays price information for the scanned product.

On account of this value, the shopping assistant is issued only to registered customers of the shop for the shopping period and is mounted on the shopping cart only temporarily.

The product description shows the shopping assistant connected to the push handle of the shopping cart by means of a swan neck connection.

The base of the swan neck is seated centrally in a region of the push handle which is normally provided as an advertising area.

A drawback of the known solution is the fact that the shopping assistant has a special holder which is fitted directly centrally in the region of the push handle which is otherwise available as an advertising area.

This disadvantageously means that this region of the push handle can no longer be used as an advertising area.

This is a drawback particularly because the shopping assistants—as already mentioned—are issued only to registered customers and therefore the majority of the customers, using shopping carts without a shopping assistant, no longer have an advertising area.

In addition, the shopping assistant is relatively large because it has its own display on which the information is displayed for the customer. This size of the shopping assistant in turn creates a correspondingly large space requirement for keeping and collecting the shopping assistants temporarily issued to the customers.

DE 19843531 A1 discloses an advertising display for a shopping cart in which electronic, possibly programmable information media are used. The advertising display described therein has nothing disclosed regarding its use as a display for a shopping assistant. The shopping assistant therefore needs to be relatively large in order to have a sufficiently large display.

DE 4232287 A1 discloses an advertising medium for holding an information medium, the information medium being able to be of holographic and/or electronic type. This information medium can perform the task of a display, but there is no disclosure regarding the use of this information medium as a display for a shopping assistant. The shopping assistant therefore needs to be relatively large in order to have a sufficiently large display.

EP 0601064 B1 discloses a shopping assistant which is temporarily fitted to the shopping cart and has its own display. The use of an advertising area permanently fitted to the cart as a display for the shopping assistant is not disclosed. This means that the shopping assistant needs to be made relatively large in order to have a sufficiently large display.

WO 97/43163 discloses a holder, which is permanently borne by the shopping cart, for a scanner or a shopping assistant, but this holder does not have any kind of display. In this case too, the shopping assistant needs to be made relatively large in order to have a sufficiently large display.

U.S. Pat. No. 6,177,880 B1 discloses a shopping assistant which is permanently integrated in the push handle of the shopping cart. In this case, the shopping assistant's display can be used as an advertising area, but increased complexity is required because, in order to produce an advertising area on any shopping cart, every shopping cart needs to be equipped with a high-value shopping assistant in this prior art.

BRIEF SUMMARY OF THE INVENTION

It is an object of the invention to provide a shopping cart having a permanently present display area in which a shopping assistant can be temporarily fitted simply and in a user-friendly manner without the permanently present display area being impaired.

Technical Solution

This object is achieved by virtue of the shopping assistant being connected to a housing arranged firmly on the shopping cart for the permanently present advertising area, the mount for the shopping assistant being arranged outside of the advertising area and the permanently present advertising area optionally also being able to be used as a display for the shopping assistant.

Advantageous Effects

The effect advantageously achieved by this is that the basic equipment of the shopping cart includes a permanent advertising area which is always visible and the shopping assistant's display is clearly visible when the shopping assistant is used on shopping carts.

The permanent advertising area is therefore a temporary substitute for the shopping assistant's display.

The shopping assistant requires the advertising area as a display whenever the user makes inputs on the shopping assistant or retrieves information from the shopping assistant.

Outside of this time, when the shopping assistant is in a kind of "standby" mode, the advertising area can display the original advertising information again.

In one development of the invention, provision is made for the advertising area permanently fitted on the shopping cart to likewise comprise an electronic display. The advertising area becomes the electronic advertising area.

The advantage of such an electronic advertising area is the facility to change the information shown on the display quickly without having to change the known paper advertising area with a corresponding level of mounting complexity.

In this case, it is possible for the information on the electronic advertising area permanently fitted to the shopping cart to be able to be changed when the shopping assistant is fitted, and for an advertisement for a different product to be able to be displayed, for example.

This advertisement for a different product remains permanently visible even when the shopping assistant has been removed.

This means that it is advantageously possible that use of the shopping assistant by the customer the permanent advertising information on the shopping cart changes without any additional complexity arising for the shop.

The temporary connection of the shopping assistant to the electronic advertising area permanently mounted on the shopping cart can also be used to recharge an energy storage device in the electronic advertising area.

In another development of the invention, a shopping assistant is used which does not have its own display and uses the electronic display permanently borne by the shopping cart to display the information.

As soon as the shopping assistant is connected to the electronic display permanently borne by the shopping cart, the electronic advertising area serves as a display for the shopping assistant.

This advantageously allows the size of the shopping assistant to be reduced.

In one development, provision is made for the electronic advertising area to additionally integrate a scanner.

This advantageously allows the size of the shopping assistant to be reduced again.

BRIEF DESCRIPTION OF THE SEVERAL VIEWS OF THE DRAWING

The invention is explained in more detail below with the aid of possible exemplary embodiments.

DESCRIPTION OF THE INVENTION

Figure 1:
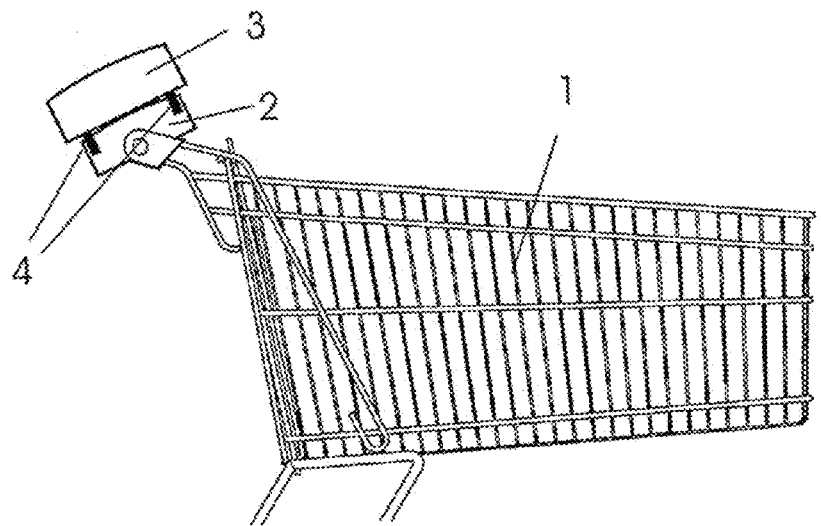
FIG. 1 schematically shows a shopping cart with a permanent advertising area unit which is fitted to the push handle and on which the shopping assistant can be temporarily mounted.

The shopping cart 1 has a push handle which bears an advertising area unit 2. This advertising area unit 2 may be in the form of a part additionally mounted on a push handle or in the form of an integrated part of a push handle.

The advertising area unit 2 has a shopping assistant 3 seated on it. The shopping assistant 3 is mounted on the advertising area unit by mounting elements 4.

Suitable mounting elements 4 are, in principle, all types of mount which allow the shopping assistant 3 to be securely held on the advertising area unit 2 and at the same time can be released quickly and without a tool.

The following possible types are mentioned: plug connections for seating the shopping assistant 3 on the advertising area unit 2 vertically or rails or grooves for pushing the shopping assistant 3 onto the advertising area unit 2.

In principle, any other type of fitting is also possible so long as the general requirement is met and the advertising area permanently borne by the advertising area unit 2 is not covered or otherwise adversely affected by the mount 4.

The advertising area unit 2 may also contain an electronic display. The advertising area becomes the electronic advertising area, and the mounting elements 4 may perform not only the mechanical tasks but also additional electrical/electronic functions:

The mounting elements 4 can then also be used for transmitting power or data.

When the shopping assistant 3 is fitted on the advertising area unit 2 mechanically, it is possible to automatically set up an electrical connection which is used to transmit power for charging an energy storage device 9 fitted in the advertising area unit 2.

It is also possible for the electrical connection to be used to transmit data and for these data to influence the information displayed on the electronic display.

This advantageously allows the use of the shopping assistant 3 by the customer to result in continual updating of the advertising area mounted permanently on the shopping cart 1 and hence for the shop's service personnel to be relieved of this activity.

Figure 2:
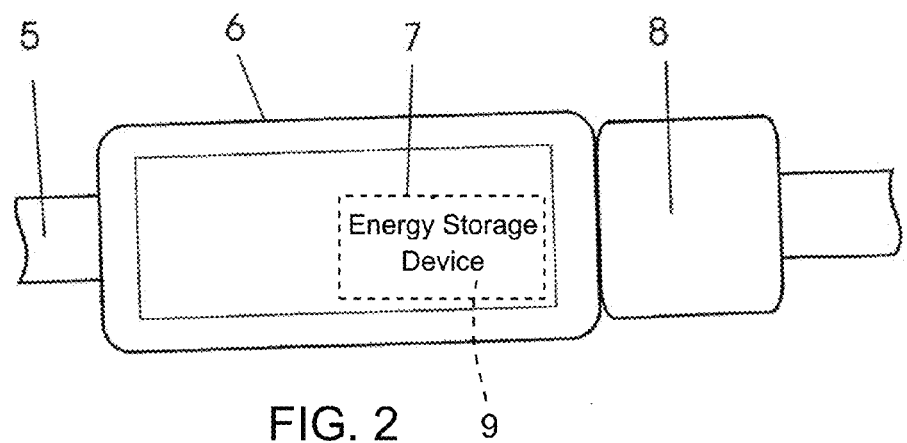
FIG. 2 shows a development of the invention in which the shopping assistant can be temporarily fitted to an advertising area unit with an electronic display, the advertising area unit for its part being permanently fitted to the shopping cart.

FIG. 2 shows a push handle section 5 bearing an advertising area unit 6 with an electronic display 7. At the side of the advertising area unit 6, the shopping assistant 8 is fitted releasably.

As already described, fitting the shopping assistant 8 on the advertising area unit 6 produces an electrical connection.

This connection allows the electronic display 7 to be used as a display for the information which is displayed to the user in conjunction with use of the shopping assistant 8.

By way of example, the shopping assistant 8 comprises a scanner which the customer uses to register the goods purchased himself and to display the price and other related information on the electronic display 7.

The effect advantageously achieved by this is that the shopping assistant 8 can be made small and handy and also less expensive, since, in comparison with the shopping assistant 3 known from the prior art, it can be operated without its own display.

It is also possible to integrate a scanner into the advertising area unit 6 and/or to use the display on the advertising area unit 6 as a touchscreen.

This lowers the complexity for the shopping assistant 8, and the shopping assistant 8 is ultimately even handier, which entails advantages when storing the shopping assistant, when issuing the shopping assistant 8 to the customer and when the customer returns the shopping assistant 8. The small dimensions mean that it is also easier to transport the shopping assistant from the checkout to the point of issue using an automatic transport apparatus.

When a shopping assistant 8 has been removed, the electronic display 7 is used as a permanent advertising area.

The content of this advertising area 7 may have been altered by the fitting of the shopping assistant 8.

It is also possible for the electronic display 7 to show not only a static picture but also moving pictures and/or graphics.

In addition, the advertising area unit 6 may also comprise a loudspeaker, in which case it is also possible to use videos for advertising purposes.

To avoid audible disruption to other customers, it is possible for the audio information to be output via headphones worn by the customer.

The headphones may be connected to the advertising area unit 6 either by wire or wirelessly.

The information may also be transmitted between the shopping assistant 8 and the advertising area unit 6 contactlessly, for example via an infrared or radio interface.

The advertising area unit 6 may also be supplied with power by means of solar cells.

In addition to the data transmission and/or power transmission from the shopping assistant 8 to the advertising area unit 6, it is also possible to perform bidirectional data interchange between the shopping assistant 8 and the advertising area unit 6.

The use of inexpensive electronic displays 7 means that it makes economic sense for every shopping cart 1 to bear such an electronic display 7 permanently.

INDUSTRIAL APPLICABILITY

The invention is industrially applicable wherever the customer is provided with shopping carts having advertising areas.

The invention claimed is:

1. An improved shopping cart having a handle, wherein the improvement comprises:
    an advertising area unit permanently disposed on said handle, said advertising area unit having a display area;
    a mounting facility for mounting an electronic shopping assistant thereon, said mounting facility disposed on said advertising area unit, said mounting facility located outside of said display area of said advertising unit;
    said advertising area unit including an energy storage device being charged by said electronic shopping assistant when said electronic shopping assistant is mounted on said mounting facility.

2. The shopping cart according to claim 1, wherein:
    the display area is permanently borne by the shopping cart and is an electronic display,
    power and/or data can be interchanged between the shopping assistant and the display area, and
    the electronic display displays information which has been transmitted from the shopping assistant to the electronic display.

3. The shopping cart according to claim 1, wherein the mounting facility is in the form of a plug connection.

4. The shopping cart according to claim 1, wherein the mounting facility is in the form of a groove connection.

5. The shopping cart according to claim 1, wherein data that has been transmitted from the shopping assistant to the electronic display continue to be displayed on the display even when the shopping assistant is no longer mounted on the shopping cart.

6. The shopping cart according to claim 1, wherein the advertising area unit comprises a scanner.

7. The shopping cart according to claim 1, wherein the advertising area unit comprises a loudspeaker.

8. The shopping cart according to claim 1, wherein the advertising area unit is adapted to connect to headphones by wire or wirelessly.

9. The shopping cart according to claim 1, wherein said advertising area unit is an electronic advertising unit.

10. The shopping cart according to claim 1, wherein said shopping assistant is mounted on said mounting facility.

* * * * *